US006767568B2

United States Patent
Tate et al.

(10) Patent No.: US 6,767,568 B2
(45) Date of Patent: Jul. 27, 2004

(54) MEAT PROCESSING SCHEME

(75) Inventors: Stanley Eugene Tate, Kettering, OH (US); John William Sellers, Jr., Spring Valley, OH (US); Morse Bartt Solomon, Ellicott City, MD (US); Bradford William Berry, Catonsville, MD (US)

(73) Assignee: Spectra Research, Inc., Dayton, OH (US)

( * ) Notice: Subject to any disclaimer, the term of this patent is extended or adjusted under 35 U.S.C. 154(b) by 398 days.

(21) Appl. No.: 09/866,565

(22) Filed: May 25, 2001

(65) Prior Publication Data

US 2002/0009526 A1 Jan. 24, 2002

Related U.S. Application Data
(60) Provisional application No. 60/209,702, filed on Jun. 5, 2000.

(51) Int. Cl.[7] .............................. A23B 4/16; A23L 1/27; A23L 1/31
(52) U.S. Cl. .................. 426/263; 426/312; 426/320; 426/332; 426/335; 426/641; 422/33; 422/39
(58) Field of Search ................................ 426/263, 312, 426/320, 332, 335, 641; 422/33, 39

(56) References Cited

U.S. PATENT DOCUMENTS

| | | | |
|---|---|---|---|
| 337,334 A | 3/1886 | Jones et al. |
| 2,169,081 A | 8/1939 | James |
| 2,544,681 A | 3/1951 | Harsham et al. |
| 2,585,103 A | 2/1952 | Fitzgerald |
| 2,830,912 A | 4/1958 | Simjian |
| 2,880,663 A | 4/1959 | Simjian |
| 2,881,080 A | 4/1959 | Simjian |
| 2,902,712 A | 9/1959 | Simjian |
| 2,980,537 A | 4/1961 | Hagen |
| 3,492,688 A | 2/1970 | Godfrey |
| 3,711,896 A | 1/1973 | Guberman et al. |
| 4,353,928 A | 10/1982 | Seliger et al. |
| 4,504,498 A | 3/1985 | Kissam |
| 5,256,430 A | 10/1993 | Suzuki et al. |
| 5,273,766 A | 12/1993 | Long |
| 5,328,403 A | 7/1994 | Long |
| 5,339,666 A | 8/1994 | Suzuki et al. |
| 5,379,621 A | 1/1995 | Suzuki et al. |
| 5,458,901 A | 10/1995 | Engler et al. |
| 5,841,056 A | 11/1998 | Long et al. |
| 6,015,580 A | 1/2000 | Mays |
| 6,074,680 A | 6/2000 | Long |
| 6,120,818 A | 9/2000 | Long |
| 6,146,262 A | 11/2000 | Long et al. |
| 6,168,814 B1 | 1/2001 | Long |
| 6,176,970 B1 | 1/2001 | Staton et al. |
| 6,200,615 B1 | 3/2001 | Long |
| 6,206,773 B1 | 3/2001 | Waits |

Primary Examiner—Arthur L. Corbin
(74) Attorney, Agent, or Firm—Dinsmore & Shohl LLP

(57) ABSTRACT

A method and apparatus for processing meat is provided. According to the method, a meat product is positioned within an interior volume of a decompression chamber. A pressure differential is created across a gas output in communication with the interior volume of the decompression chamber. The decompression chamber is then rapidly decompressed by transferring gas from the interior volume of the decompression chamber through the gas output. The pressure differential and the rate of the rapid decompression are selected to be suitable for processing the meat product positioned within the interior volume of the decompression chamber. Typically, the pressure differential and the rate of rapid decompression are selected to be suitable for tenderizing the meat product, killing microorganisms in the meat product, or both.

25 Claims, 1 Drawing Sheet

MEAT PROCESSING SCHEME

CROSS-REFERENCE TO RELATED APPLICATIONS

This patent application is related to U.S. patent application Ser. No. 09/444,821, filed Nov. 22, 1999, now U.S. Pat. No. 6,439,891. This application claims the benefit of U.S. patent application Ser. No. 60/209,702, filed Jun. 5, 2000.

BACKGROUND OF THE INVENTION

The present invention relates to meat processing and, more specifically, to tenderization and sterilization of meat products via rapid decompression. Meat is a natural product and is subject to wide variation in its properties. Meat is also subject to bacterial contamination.

Given the enormous size of the meat industry, there exists a powerful economic incentive to produce tender meat because it commands a substantially higher price than tough meat. Historically, tender meat has been produced mainly by genetic selection and animal husbandry practices that maximize tenderness. More recently, mechanical and chemical processes have been developed for tenderizing meat. These more recent meat tenderization schemes have significant drawbacks involving safety issues, process complexity, and cost. There is also a powerful economic incentive in the meat industry to prevent contamination of meat because contaminated meat is dangerous and presents significant liability problems. Accordingly, there is a continuing drive in the meat industry to develop optimal and cost effective meat processing schemes that increase tenderness and reduce risk of contamination.

BRIEF SUMMARY OF THE INVENTION

This need is met by the present invention wherein an improved scheme for processing meat is provided. In accordance with one embodiment of the present invention, a method of processing meat is provided. According to the method, a meat product is positioned within an interior volume of a decompression chamber. The interior volume of the decompression chamber is pressurized. The decompression chamber is then rapidly decompressed. The rate of the rapid decompression defines a magnitude suitable for processing the meat product positioned within the interior volume of the decompression chamber.

In accordance with another embodiment of the present invention, a method of processing meat is provided. According to the method, a meat product is positioned within an interior volume of a decompression chamber. A pressure differential is created across a gas output in communication with the interior volume of the decompression chamber. The decompression chamber is then rapidly decompressed by transferring gas from the interior volume of the decompression chamber through the gas output. The pressure differential and the rate of the rapid decompression are selected to be suitable for processing the meat product positioned within the interior volume of the decompression chamber. Typically, the pressure differential and the rate of rapid decompression are selected to be suitable for tenderizing the meat product, killing microorganisms in the meat product, or both.

The meat may be further processed by recreating the pressure differential following the rapid decompression and repeating the rapid decompression. The pressure differential may be created by introducing compressed gas into the interior volume of the decompression chamber or by maintaining the interior volume of the decompression chamber near atmospheric pressure and placing the gas output in communication with a vacuum chamber below atmospheric pressure.

In accordance with yet another embodiment of the present invention, a meat processing apparatus is provide. The apparatus comprises a decompression chamber, a gas output, and a decompression valve. The decompression chamber defines an interior volume and is configured to permit a meat product of substantial size to be placed within and removed from the interior volume. The gas output is in communication with the interior volume of the decompression chamber. The decompression valve is arranged along the compressed gas output and is configured to (i) enable creation of a pressure differential across the decompression valve with a relatively positive pressure within the interior volume of the decompression chamber and (ii) enable rapid decompression of the decompression chamber through transfer of gas from the interior volume of the decompression chamber through the decompression valve. The pressure differential and the rate of the rapid decompression define magnitudes suitable for processing a meat product positioned within the interior volume of the decompression chamber.

Accordingly, it is an object of the present invention to provide a scheme for processing a meat product by rapid decompression of the meat product. Other objects of the present invention will be apparent in light of the description of the invention embodied herein.

BRIEF DESCRIPTION OF THE DRAWING

The following detailed description of the preferred embodiments of the present invention can be best understood when read in conjunction with FIG. 1, which is a general schematic illustration of a meat processing apparatus according to the present invention.

DETAILED DESCRIPTION

Figure 1:
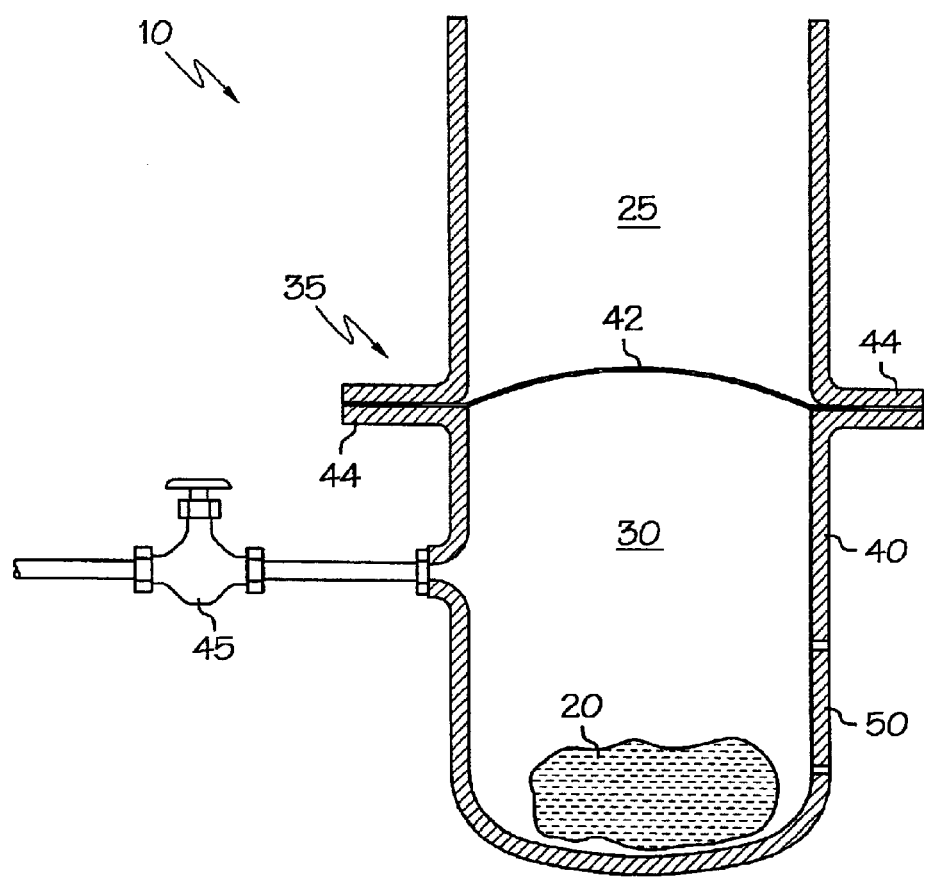

The scheme for processing meat according to the present invention may be executed with a variety of meat processing apparatuses including, but not limited to, the meat processing apparatus 10 illustrated in FIG. 1. Accordingly, the present invention is illustrated herein with primary reference to the method by which meat products may be processed.

According to the present invention, meat is processed by positioning a meat product 20 within an interior volume 30 of a decompression chamber 40. A pressure differential is created across a gas output 25 in communication with the interior volume 30 of the decompression chamber 40. The decompression chamber 40 is rapidly decompressed by transferring gas from the interior volume 30 of the decompression chamber 40 through the gas output 25. Preferably, the gas is transferred by opening a high-speed decompression valve 35. The meat product 20 may be further processed by recreating the pressure differential following the rapid decompression and repeating the rapid decompression. This sequence may be executed a plurality of times, until the desired processing result is achieved. It is noted that, although an unfrozen meat product may respond more favorably to the decompression process of the present invention, the meat product 20 may be frozen or unfrozen.

The decompression chamber 40 is configured to permit a meat product 20 of substantial size to be placed within and removed from the interior volume 30. For the purposes of describing and defining the present invention, it is noted that a meat product of substantial size comprises a meat product that is at least large enough to constitute a single serving for human consumption. It is contemplated that the decompression chamber 40 of the present invention will have a capacity sufficient to permit treatment of a meat products ranging from about 0.1 kg to over 25 kg. It is also noted that the meat processing apparatus 10 is configured such that the meat product may be repeatedly placed in and removed from the decompression chamber 40 without significant destruction of the apparatus 10 to enable repeated or successive meat treatments. To this end, the meat processing apparatus 10 preferably includes a port 50 for loading and unloading the meat product 20. Preferably, the load/unload port 50 defines a reusable high-pressure seal.

The specific structure of the high-speed valve 35 is not critical to the present invention. Rather, the high-speed valve need only be configured to permit rapid decompression of the decompression chamber. The high-speed valve 35 illustrated in FIG. 1 comprises a rupture disc 42 clamped between flanges 44 of the decompression chamber 40 and gas output 25. Typically, the flanges 44 are forcibly held together by bolts, external "C" clamps, toggle clamps, etc.

The thickness and material properties of the rupture disc 42 are chosen to burst when a predetermined pressure differential is created across the disc 42. The pressure differential at which the disc will burst is optimized to produce the desired processing effect. Typical materials are metals, such as annealed aluminum or steel, but could include any gastight material having the proper bursting pressure, such as plastic. A variety of rupture discs having different bursting pressures may be used for different meats or cuts of meat.

After the meat product 20 has been placed in position, a compressed gas supply valve 45 is opened to admit compressed gas from a compressed gas supply to the interior volume 30 of the decompression chamber 40. The supply valve 45 may be any kind of valve, for example a manually or electrically operated valve. The size and opening speed of supply valve 45 are selected to permit pressurization of the required volume in a reasonable time—for example, less than a minute. Where a rupture disc 42 is used as the high-speed valve 35, the compressed gas supply must supply a pressure in excess of the bursting pressure of rupture disc 42. As a practical matter, the pressure of compressed gas supply must be substantially higher than the bursting pressure of rupture disc 42 in order to pressurize the volume under rupture disc 42 in a reasonable period of time.

For tenderizing meat, the pressure differential may be about 100 to about 300 pounds per square inch (about 650 kPa to about 2000 kPa) or may be any other suitable value. For sterilizing meat or killing any microorganisms present in the meat, the differential may be determined experimentally. Where meat at atmospheric pressure is decompressed to a vacuum, the pressure differential is about 100 kPa. Similarly, although the rate of decompression typically exceeds about 70 MPa/sec, it is noted that the rate may vary, depending upon the specific processing goal and the specific meat product to be processed. For the purposes of describing and defining the present invention, it is noted that "rapid" decompression is utilized herein to refer to decompression rates equal to or above about 10 MPa/sec. It is contemplated that significant tenderization of a meat product may be achieved at a decompression rate between about 10 MPa/sec and about 350 MPa/sec.

The supply valve 45 may be left open until the high-speed valve 35 is opened. It is economically advantageous to close the supply valve rapidly after the high-speed valve is opened to conserve the compressed gas supply. After the flow of gas has been shut off, the apparatus may be partially disassembled for replacement of the rupture disc 42 (if used) and removal of the meat 20, unless it is intended to subject the meat 20 to additional explosive decompressions.

The thickness and material properties of the decompression chamber 40 are chosen to withstand the pressure to be created therein, with a suitable safety factor. The decompression chamber 40 should also be constructed of a material that allows cleaning and sterilizing in accordance with meat packing industry sanitary practices. Typical materials may be stainless steel or aluminum.

The specific structure of the gas output 25 is also not critical to the present invention. Preferably, the upper end of the output 25 is open to the atmosphere. In some embodiments of the present invention, the output 25 does not have to withstand the pressure to which the decompression chamber 40 is subjected, it merely directs the air or gas blast resulting from bursting of the rupture disc, as well as any rupture disc fragments, in a safe direction. It should be noted that the functioning of the apparatus shown in FIG. 1 is independent of orientation. The vertical orientation shown in FIG. 1 is convenient since the meat 20 lies at the bottom of decompression chamber by gravity and the blast is directed upward, away from personnel in the vicinity. It is contemplated that a plurality of gas outputs 25 may be provided to increase the rate of decompression.

According to the configuration of the present invention described above with reference to FIG. 1, the pressure differential is created by introducing compressed gas into the interior volume 30 of the decompression chamber 40. However, it is contemplated by the present invention that the pressure differential may also be created by maintaining the interior volume 30 of the decompression chamber 40 near atmospheric pressure and placing the gas output 25 in communication with a vacuum chamber (not shown) below atmospheric pressure. According to this configuration, the meat product 20 is not subject to pressures above atmospheric pressure and may be processed by rapidly decompressing the chamber 40 to a value below atmospheric pressure. It is noted that, in this embodiment of the present invention, the volume of the vacuum chamber will preferably exceed significantly the volume of the decompression chamber 40.

The interior volume 30 of the decompression chamber 40 may be filled with a gas designed to inhibit spoilage of the meat product 20. Additionally, or alternatively, the decompression chamber 40 may be filled with an oxygenating gas having a composition selected to enhance the color of the meat product. The spoilage inhibiting gas may comprise, for example, substantially pure carbon dioxide. The oxygenating gas may comprise, for example, substantially pure oxygen.

As is noted above, the meat processing scheme of the present invention may be executed with a variety of meat processing apparatuses including, but not limited to, the meat processing apparatus 10 illustrated in FIG. 1. Some alternatives to the meat processing apparatus 10 illustrated in FIG. 1 will achieve rapid decompression by using an alternative to the rupture disc 42. For example, the high-speed valve 35 may comprise a reciprocating high-speed valve like the one illustrated in International Patent Publication Number WO 00/31448, published Jun. 2, 2000, or other types of electromechanical valves, venting schemes, or decompression ports. It is contemplated that a variety of gas supply, decompression chamber, and high-speed valve arrangements may be utilized in accordance with the present invention.

Additional features of the meat processing apparatus 10 of the present invention include an automatic controller, for monitoring and controlling the pressurization and decompression of the decompression chamber 40, and noise damping or absorbing structure, for reducing noise generated by the blast of released gas.

Having described the invention in detail and by reference to preferred embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of processing meat by:
   positioning a meat product within an interior volume of a decompression chamber;
   creating a pressure differential across a gas output in communication with said interior volume of said decompression chamber; and
   rapidly decompressing said decompression chamber at a decompression rate of at least about 10 MPa/sec by transferring gas from said interior volume of said decompression chamber through said gas output.

2. A method of processing meat as claimed in claim 1 wherein said pressure differential and said rate of rapid decompression are selected to be suitable for tenderizing said meat product.

3. A method of processing meat as claimed in claim 1 wherein said pressure differential and said rate of rapid decompression are selected to be suitable for killing microorganisms in said meat product.

4. A method of processing meat as claimed in claim 1 wherein said decompression chamber is rapidly decompressed upon bursting of a rupture disc configured to burst under a predetermined pressure differential.

5. A method of processing meat as claimed in claim 1 wherein said decompression chamber is rapidly decompressed upon activation of a reciprocating high-speed valve.

6. A method of processing meat as claimed in claim 1 wherein said rate of rapid decompression is between about 10 MPa/sec and about 350 MPa/sec.

7. A method of processing meat as claimed in claim 1 wherein said pressure differential is created by introducing compressed gas into said interior volume of said decompression chamber.

8. A method of processing meat as claimed in claim 1 wherein said pressure differential is created by maintaining said interior volume of said decompression chamber near atmospheric pressure and placing said gas output in communication with a vacuum chamber below atmospheric pressure.

9. A method of processing meat as claimed in claim 1 wherein said decompression chamber is rapidly decompressed by elevating said pressure differential beyond a bursting limit of a rupture disc extending across said gas output.

10. A method of processing meat as claimed in claim 1 wherein said decompression chamber is rapidly decompressed by actuating a valve extending across said gas output.

11. A method of processing meat as claimed in claim 1 wherein said pressure differential is created by filling said interior volume of said decompression chamber with an oxygenating gas having a composition selected to enhance a red color of said meat product.

12. A method of processing meat as claimed in claim 11 wherein the amount of oxygen present in said oxygenating gas significantly exceeds the amount of oxygen present in air.

13. A method of processing meat as claimed in claim 12 wherein said oxygenating gas consists essentially of substantially pure oxygen.

14. A method of processing meat by
   positioning a meat product within an interior volume of a decompression chamber;
   creating a pressure differential across a gas output in communication with said interior volume of said decompression chamber, wherein sent pressure differential is created by filling said interior volume with a an oxygenating gas having a composition selected to enhance the color of the meat product; and
   rapidly decompressing said decompression chamber at a rapid decompression rate by transferring gas from said interior volume of said decompression chamber through said gas output.

15. A method of processing meat as claimed in claim 14 wherein the amount of said gas is selected to enhance a red color of said meat product.

16. A method of processing meat as claimed in claim 14 wherein the amount of oxygen in said gas significantly exceeds the amount of oxygen present in air.

17. A method of processing meat as claimed in claim 14 wherein said gas consists of essentially pure oxygen.

18. A method of processing meat as claimed in claim 17 wherein said spoilage inhibiting gas comprises carbon dioxide.

19. A method of processing meat as claimed in claim 14 wherein said pressure differential and said rapid decompression rate are selected to be suitable for killing microorganisms in said meat product.

20. A method of processing meat as claimed in claim 14 wherein said gas further comprises a spoilage inhibiting gas.

21. A method of processing meat as claimed in claim 17 wherein said pressure differential and said rapid decompression rate are selected to be suitable for tenderizing said meat product.

22. A method of processing meat as claimed in claim 14 wherein said rapid decompression rate is at least about 10 MPa/sec.

23. A method of processing meat as claimed in claim 14 wherein said rapid decompression rate is between about 10 MPa/sec and about 350 MPa/sec.

24. A method of processing meat as claimed in claim 14 wherein said decompression chamber is rapidly decompressed upon bursting of a rapture disc configured to burst under a predetermined pressure differential.

25. A method of processing meat as claimed in claim 14 wherein said decompression chamber is rapidly decompressed upon activation of a reciprocating high-speed valve.

* * * * *